Nov. 5, 1957     W. F. WROTH     2,812,167

LIQUID SPRAY GENERATOR

Filed Oct. 27, 1954

INVENTOR.
William Fabyan Wroth
BY
S. Stephen Baker
ATTORNEY

United States Patent Office 2,812,167
Patented Nov. 5, 1957

2,812,167

LIQUID SPRAY GENERATOR

William Fabyan Wroth, Austin, Tex.

Application October 27, 1954, Serial No. 465,060

10 Claims. (Cl. 261—30)

The present invention relates to a high efficiency spray forming generator which uses both the velocity and static pressures of a flowing gas for its spray forming action and more particularly to a spray forming generator of this character which may be used for evaporative cooling effects, washing a gas with a liquid or producing an intimate mixture of a gas and a liquid in the form of a spray for any other desired purpose.

Generally, the invention comprises a receptacle for retaining the spray liquid, a spray forming partition partially immersed in the liquid, means for supplying gas under pressure to one side of the partition for creating a pressure differential between opposite sides thereof, and a series of partially submerged, through apertures formed in the partition for producing mutually oppositely directed spray forming currents of gas and liquid flowing simultaneously through the apertures.

A principal feature of the invention is its ability to produce large volumes of fine spray of high liquid content with a minimum amount of gas flow. This results in a high efficiency device in which the power consumption is minimized when a power operated blower or compressor is used for producing the pressure differential. A feature of the invention resides in the fact that it employs a simple and inexpensive blower operating at moderate pressure instead of the usual costly high pressure liquid pumps and spray heads. The spray forming device of the invention differs from known devices for this purpose in its higher efficiency, simplicity of construction, low cost of manufacture, versatility, and adaptability to a wide range of operating conditions.

Various other features, objects and advantages of the invention will become apparent upon reading the following specification together with the accompanying drawing forming a part hereof.

Referring to the drawing.

Figure 1:
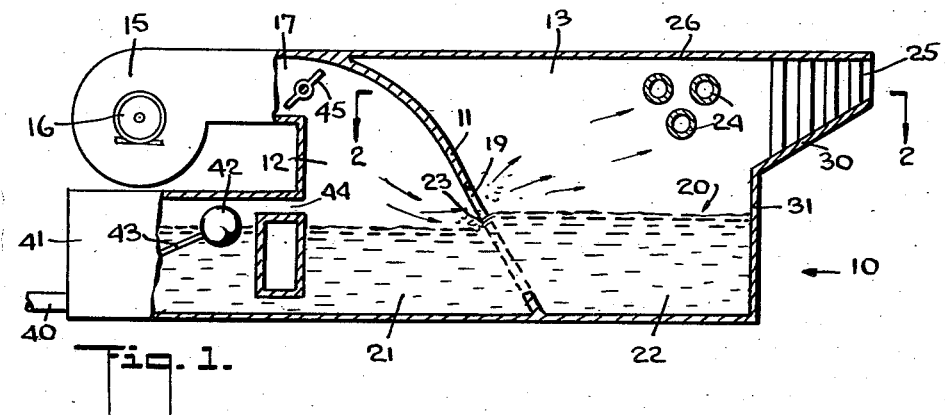
Figure 1 is a sectional view in elevation of a spray generator embodying the invention.
Figure 2:
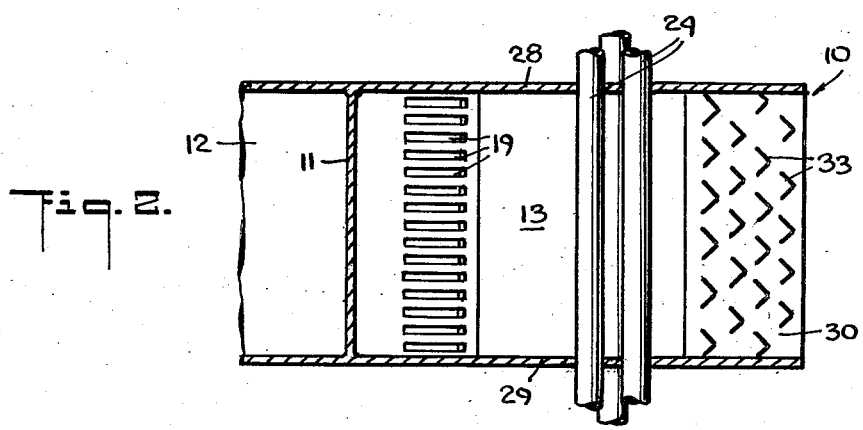
Figure 2 is a fragmentary plan view, partly in section, taken along the line 2—2 of Figure 1, with the liquid omitted.

Referring to Figure 1, there is shown a housing designated generally as 10. The housing 10 is shown for simplicity of illustration as though it were formed of a single unitary wall structure without joints. It is to be understood, however, that the housing 10 may consist of sheet metal with the usual riveted, soldered or welded seams, or may be formed in any desired manner as by casting or molding.

A partition 11 which is shown inclined downwardly and toward the right to the floor of the housing, divides the housing 10 into two compartments 12 and 13. A power operated centrifugal blower 15 driven by an electric motor 16 is connected by a duct 17 with the pressure compartment 12. The inclined partition 11 has a series of spaced, parallel, elongated, substantially vertical spray-forming slots 19 formed therein.

Disposed in the bottom of the housing 10 is a body of spray-forming liquid designated generally as 20 and divided into two portions by the partition 11. One portion 21 of liquid 20 is disposed in the pressure compartment 12 and another portion 22 of liquid 20 is disposed in the spray compartment 13. Under static conditions, when the blower 15 is idle, the level of the liquid portions 21 and 22 is the same in the two compartments 12 and 13 because these compartments communicate with each other through the partially submerged spray-forming slots 19.

The body of liquid 20 is thus divided by the partition 11 into two portions 21 and 22 which are interconnected at their respective surfaces by a plurality of spaced constricted liquid portions 23 each of which has a restricted gas passage thereabove defined by the unsubmerged portion of one of the slots 19, permitting the flow of spray forming gas over and in intimate contact with each constricted liquid portion 23.

In the form shown, a group of heat exchange tubes 24 are shown extending transversely across the spray compartment 13 above the liquid 22. A large number of such tubes may be used in practice in order to provide a large heat transfer area. In the drawing, however, only three tubes 24 have been shown for simplicity of illustration. The tubes 24 may form a part of an evaporative condenser (not shown) of the type used in refrigeration apparatus or they may form a part of any other heat exchange apparatus which utilizes the cooling action of the spray being generated in accordance with the invention.

The spray chamber 13 communicates with the atmosphere through an exhaust passage 25 defined by the top wall 26 of housing 10, the near and far side walls 28 and 29, respectively, of housing 10 and an inclined bottom wall 30 of the exhaust passage 25. The lower inner end of inclined bottom wall 30 terminates at the top of the far end wall 31 of housing 10 so as to direct excess liquid back into the chamber but any equivalent means may be employed for this purpose as well as for the entire passage 25 which merely serves as a spray eliminator. Conventional baffle members 33 are provided, (this may take the form of a fine wire screen mesh or the like) so as to provide a tortuous path for spray laden air or other gas leaving the spray chamber 13 through the exhaust passage 25 for removing excess spray therefrom and recovering and returning the excess liquid down the inclined bottom wall 30 to the body of liquid 22 within the spray chamber 13.

In operation, air under pressure from blower 15 enters the pressure compartment 12 and depresses the level of the liquid 21 in the pressure compartment 12 with respect to the level of the liquid 22 in spray compartment 13. The air pressure differential between compartments 12 and 13 arises from the air flow resistance of the unsubmerged portions of spray-forming slots 19 in partition 11 which divide the air into a plurality of streams and constrain the air to flow through apertures of restricted areas, in intimate contact with the liquid. This air pressure differential between liquid portions 21 and 22, causes the level of liquid 22 in spray compartment 13 to rise above the level of the liquid 21 in pressure compartment 12 and the rise in level of liquid portion 22 still further reduces the areas of the air passages through the slots 19 and thus further increases both the gas and liquid pressure differential between the compartments 12 and 13.

Figures 3, 4:
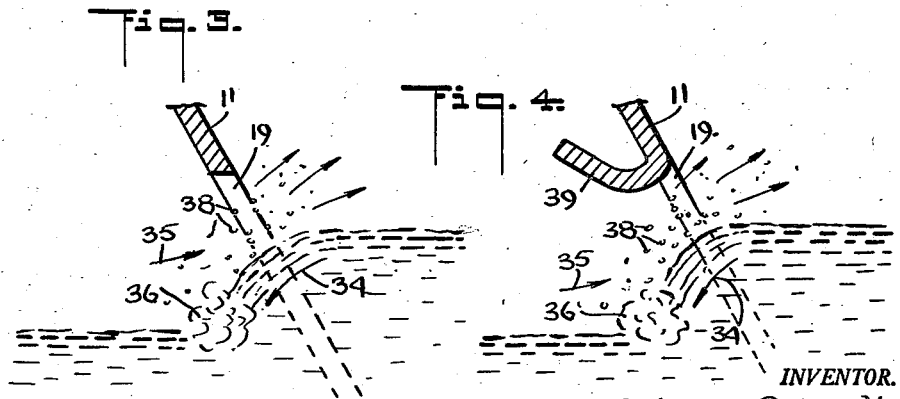
Figure 3 is an enlarged fragmentary diagrammatic view in sectional elevation illustrating the operation of the spray generator.
Figure 4 is an enlarged fragmentary view in sectional elevation showing a modified form of the invention.

As shown in Figure 3, the liquid 22 at a higher level in spray chamber 13 tends to flow by gravity back through the slots 19 into the pressure compartment 12, as indicated by the arrow 34. Air under pressure, however, from pressure compartment 12, is flowing simultaneously in the opposite direction through the upper portions of the slots 19 into the spray chamber 13 as indicated by the arrow 35. The waterfall action of the flowing liquid creates a turbulence as indicated at 36 which inherently tends to generate spray. The air or other gas flowing in the opposite direction in the direction of the arrow 35, picks up such spray particles and carries them along through the slots 19 above the constricted liquid portions 23 into the spray chamber 13. Additionally, the air or other gas, which is moving at fairly high velocity in the direction opposite to the direction of liquid flow, inherently ruffles the surface of the liquid and forms additional spray particles which are also carried into the spray chamber 13.

It should be noted that the partition 11 slopes downwardly proceeding from the pressure compartment 12 to the spray compartment 13. This places the uppermost portion of the higher level liquid 22 in spray compartment 13 in an overhanging position above the gas in pressure compartment 12, so that the gas in pressure chamber 13 will exert a force having an upwardly directed component on the overhanging portion of the liquid 22. This further upwardly directed gas pressure enhances the spray formation by causing a tendency to form bubbles.

As shown in Figure 4 the partition 11 may be provided with an inwardly directed and upwardly curving tongue 39 disposed at the upper end of each spray forming slot 19. The tongue 39 tends to streamline the airflow at the upper end of each slot 19 without interfering with the turbulence where the air is in intimate contact with the constricted liquid portion 23.

The spray particles thus formed tend to evaporate in the air or other gas, the rate and extent of such evaporation being determined by the degree of saturation of the air or other gas in the pressure compartment 12, the respective gas and liquid temperatures, and other similar factors. This evaporation absorbs heat from the spray laden gas, causing a drop in temperature so that the spray laden gas will absorb heat from the heat exchange tubes 24 at a higher rate and more efficiently than if air or other gas were used alone without the spray. The spray generator may also be used alone without any heat exchange apparatus as for room cooling, for example, in which case the heat exchange tubes 24 would be omitted and the cooled exhaust air from exhaust passage 25 would be directed into the room or other space to be cooled. It may also be used for cooling towers or other applications in which a cooling spray is utilized.

In order to automatically replenish the liquid 20 which is evaporated or otherwise carried away, I provide a liquid supply line 40 connected through a liquid level control device 41 to the bottom of pressure compartment 12. The liquid level control device 41 may be of any desired type and is illustratively shown comprising a ball float 42 connected to a liquid flow control arm 43. The arm 43 is in turn connected to a valve or other device (not shown) for admitting liquid under pressure from line 40 to housing 10 as required to maintain a constant liquid level in the pressure compartment 12. Alternatively, the replacement liquid supplied by line 40 could be admitted to spray compartment 13. An air or gas passage 44 disposed above the level of liquid 21 interconnects the space above ball float 42 with pressure compartment 12 so that the position of ball float 42 will be controlled entirely by the level of liquid 21 independently of the pressure in pressure compartment 12. However, the liquid may be replenished manually if desired.

To control the spray-forming action, the air flow from blower 15 may be regulated by means of a butterfly valve 45 disposed in duct 17. The blower may be of the centrifugal, disc, or propeller type and it should be of a capacity sufficient to develop at least one inch of water pressure. If desired, the valve 45 may be disposed in the exhaust passage 25 either ahead of or beyond the baffle members 33, or the baffle members 33 may be made adjustable to regulate the rate of air flow therethrough. Partition 11 may be made adjustable so that the slots 19 may be submerged to a greater or lesser extent to obtain the optimum spray-forming action and it need not extend to the floor of the housing 10, since only submersion is required as above set forth.

It will be seen that I have provided a simple, inexpensive and highly efficient spray generator which further requires substantially no maintenance since it is non-clogging. Although I have described what I believe to be the best embodiments of my invention, it will be apparent to those skilled in the art that many changes and modifications may be made therein without departing from the spirit of the invention or the scope of the invention as defined in the appended claims.

What is claimed is:

1. A spray generator of the class described, comprising: a housing, a quantity of liquid partially filling said housing, partition means disposed within said housing and dividing said housng into a closed pressure compartment and a spray compartment and dividing said quantity of liquid into two portions each located in one of said compartments, said partition means extending continuously both above and below the upper surfaces of both portions of said liquid, said partition means having a plurality of passages formed therein, said passages being partially submerged in said liquid for permitting said liquid to flow therethrough by gravity from one compartment to the other to equalize the levels of said two portions of said liquid, a source of gas under pressure connected to said pressure compartment to increase the pressure therein relative to said spray compartment for maintaining the liquid level in said spray compartment higher than in said pressure compartment, and exhaust means connected to said spray compartment to permit said gas to leave the same, whereby the said liquid will flow by gravity through said passages from said spray compartment into said pressure compartment while said gas flows through the upper portions of said passages in the direction opposite to said last named flow direction of said liquid so as to produce a spray laden gas which is carried into said spray compartment and out through said exhaust means.

2. A spray generator according to claim 1, wherein said passages are spaced parallel elongated slots.

3. A spray generator according to claim 1, in which said source of gas under pressure is a power operated centrifugal blower.

4. A spray generator according to claim 1, wherein said gas is air to be humidified, in which said liquid is water, wherein said partition means consists of a sheet of material which slopes downwardly into said liquid in the direction proceeding from said pressure compartment to said spray compartment, and in which said passages consist of apertures formed in said sheet, said slope causing the water in said spray compartment to overhang the water in said pressure compartment thereby producing a waterfall action, and whereby the pressure exerted by gas in said pressure compartment on the uppermost portion of the liquid in said spray compartment will have an upward component which enhances the spray formation by causing a tendency to form air bubbles.

5. A spray generator according to claim 4, wherein said apertures consist of a series of spaced elongated slots having longitudinal axes lying in parallel planes normal both to the surface of said liquid and to said sloping sheet.

6. A spray generator according to claim 4, wherein said sheet is provided with lip portions each of which extends from a portion of said sheet immediately adjacent to and above one of said apertures and which curves upwardly into said pressure compartment for streamlining the flow of air through the upper portions of said apertures.

7. A spray generator of the class described, comprising a closed housing, a partition member extending transversely completely across said housing and from the top of said housing to the bottom thereof, said partition member dividing said housing into a pressure compartment and a spray compartment, said partition member having a horizontally extending series of apertures formed therein located intermediate its upper and lower extremities, means for maintaining said apertures partially filled by said liquid, means for supplying gas under pressure to said pressure compartment for depressing the liquid level therein relative to the liquid level in said spray compartment whereby said liquid flows by gravity through said apertures from said spray compartment into said pressure compartment, and exhaust means communicating with said spray compartment for exhausting gas from said spray compartment and thereby causing gas to flow through said partially filled apertures in the direction opposite to the direction of the gravity flow of said liquid therethrough, whereby a liquid spray is formed by said oppositely flowing gas and liquid, said spray being carried out of said housing through said exhaust means.

8. A spray generator according to claim 7, in which said partition member is inclined so that a portion of the liquid in said spray compartment overhangs a portion of the liquid in said pressure compartment.

9. A spray generator according to claim 7, in which said apertures are upwardly and downwardly extending elongated slots.

10. A spray generator according to claim 7, in which said partition member is a sheet of material so inclined that a portion of the liquid in said spray compartment overhangs a portion of the liquid in said pressure compartment, said apertures being in the form of straight elongated upwardly and downwardly extending slots, said slots being arranged to remain partially filled with liquid notwithstanding variations in the levels of the liquid in said pressure and spray compartments, respectively, said liquid flowing through said slots with a waterfall effect in said pressure compartment.

References Cited in the file of this patent

UNITED STATES PATENTS

| | | |
|---|---|---|
| 919,611 | Martin | Apr. 27, 1909 |
| 1,214,372 | Romberger | Jan. 30, 1917 |
| 1,792,286 | Curry et al. | Feb. 10, 1931 |
| 2,064,833 | Howard | Dec. 22, 1936 |
| 2,119,207 | Gibbs | May 31, 1938 |
| 2,120,490 | Drummond | June 14, 1938 |
| 2,380,548 | Queneau | July 31, 1945 |
| 2,403,545 | Nutting | July 9, 1946 |
| 2,491,645 | Clark | Dec. 20, 1949 |
| 2,680,599 | Wile | June 8, 1954 |